Inventor:
Richard G. Hennessey

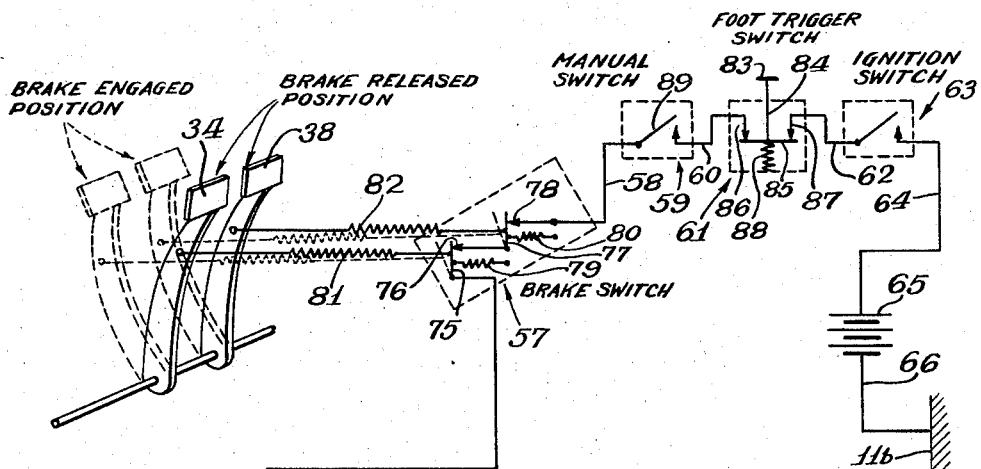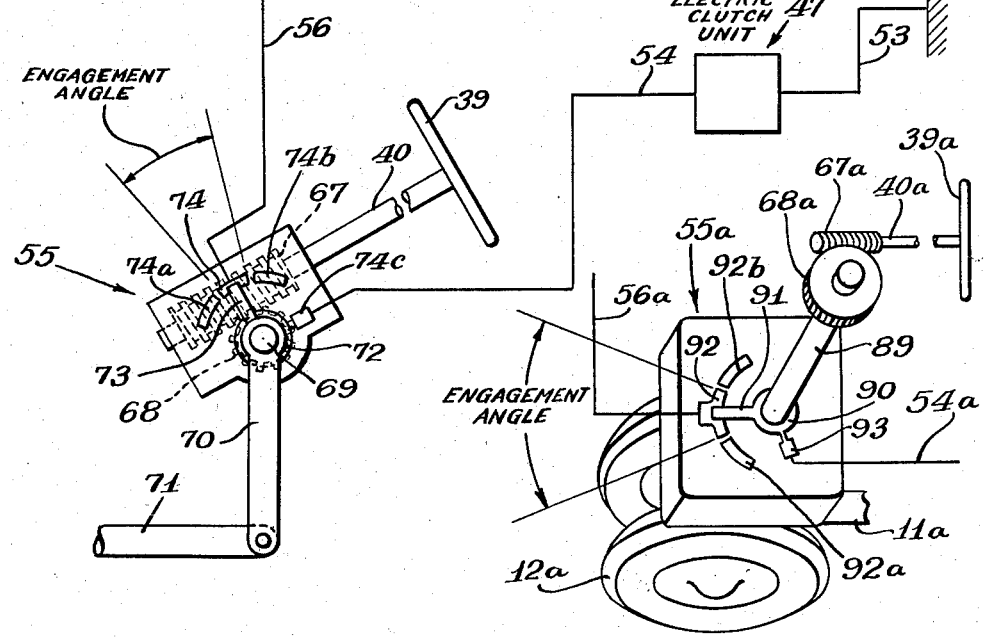

United States Patent Office 2,874,790
Patented Feb. 24, 1959

2,874,790

STEERING BY DRIVING WITH DIFFERENTIAL LOCK-OUT BULL GEAR COUPLING

Richard G. Hennessey, Chicago, Ill., assignor to International Harvester Company, Chicago, Ill., a corporation of New Jersey Application July 3, 1957, Serial No. 669,788

6 Claims. (Cl. 180—6.2)

This invention relates to final drive mechanisms for a vehicle, but more particularly it is concerned with a coupling or interconnecting means including the controls therefore provided for interlocking the drive wheels and the differential drive mechanism of the vehicle.

Heretofore, many devices have been proposed for drivingly interlocking the driving wheels of a vehicle around or through the differential in order to transfer substantial portions of the tractive effort of the vehicle to one of the wheels thereof when the remaining wheel is losing traction, such as the condition which is frequently encountered when the ground surface therebeneath is wet or slippery, or when one wheel has been so elevated as to substantially lose frictional engagement with the ground therebeneath. Differential drives equipped with means to accomplish such coupling action are frequently referred to as of the non-slip or interlocking type but, as is well known, many of the devices that have been proposed for this purpose have, for one reason or another, met with only varying degrees of success. In consequence thereof it has been suggested, by various authorities thoroughly conversant with such devices, that the ideal mechanism of this character should be able to meet and fulfill certain specifications or requirements such as: maintaining differential action; preventing shock loads, and the transfer of full engine torque to one axle shaft; providing for sufficient traction torque to the non-spinning wheel at all times and under all operating conditions; non-interference with steering of the vehicle; long life and not being subject to abnormal loads of wear; continuation of function efficiently, regardless of the amount of wear; quietness in operation; minimum size and weight; and being adaptable without major design change for use in present day axles. Many of the previous devices did not embrace all or even a large portion of these ideal requirements and hence the present invention is concerned with the provision of a novel and improved form of a coupling mechanism that will embody a maximum number of the aforesaid consummate requirements. More particularly, however, a feature of the present invention is directed to a means for controlling the operation of interlocking means in a non-slip type of differential.

A general object of the invention is to provide means for coupling or interlocking the drive wheels of a vehicle drivingly together so that one wheel thereof will increase its tractive pull in the event the other wheel loses some traction, thus enabling the vehicle to utilize full engine power and retain mobility so long as either of the wheels or a combination of the two, can achieve sufficient traction.

Another object is to provide, in a tractor vehicle using a conventional double bull gear reduction final drive assembly, means, separate from but cooperative with the differential of said final drive, for drivingly interlocking the drive wheels of the vehicle.

A further object is to provide electrically actuated friction clutch means together with a control circuit therefor for drivingly interconnecting or coupling together the propelling or drive wheels of a vehicle.

An important object is to provide actuatable means in an electrical control circuit for actuating electrical friction clutching means for drivingly interconnecting the driving wheels of a vehicle, and having said actuatable means cooperative with the braking mechanism of the vehicle whereby said electrically actuated clutching means may be disengaged upon operation of the friction brake on either of the vehicle's driving wheels.

A specific object is to provide in the electrical control circuit, for an electrically actuated friction clutch operable for interconnecting the driving wheels of a vehicle, means for inactivating said control circuit when the brake or steering mechanisms of the vehicle are manipulated.

Another specific object is to provide an electrical control circuit, for an electrically actuated friction clutch engageable for coupling together the driving wheels of a vehicle, incorporating therein a plurality of individually operable make-and-break devices so connected in said circuit that manipulation of any one of said devices makes the circuit operative to effect disengagement of said clutch to uncouple said driving wheels.

The foregoing and other objects and features of the invention will become apparent as the disclosure is more fully made in the following detailed description of a preferred embodiment of the invention as illustrated in the accompanying sheets of drawings in which:

Fig. 2 is a schematic diagram showing the application of the present invention, and of the electrical control circuit employed with the mechanism, as incorporated in a tractor vehicle; and Fig. 3 is a diagrammatic plan view illustrating a modified form of the front steering assembly of a tractor employing the present invention.

Figure 1:
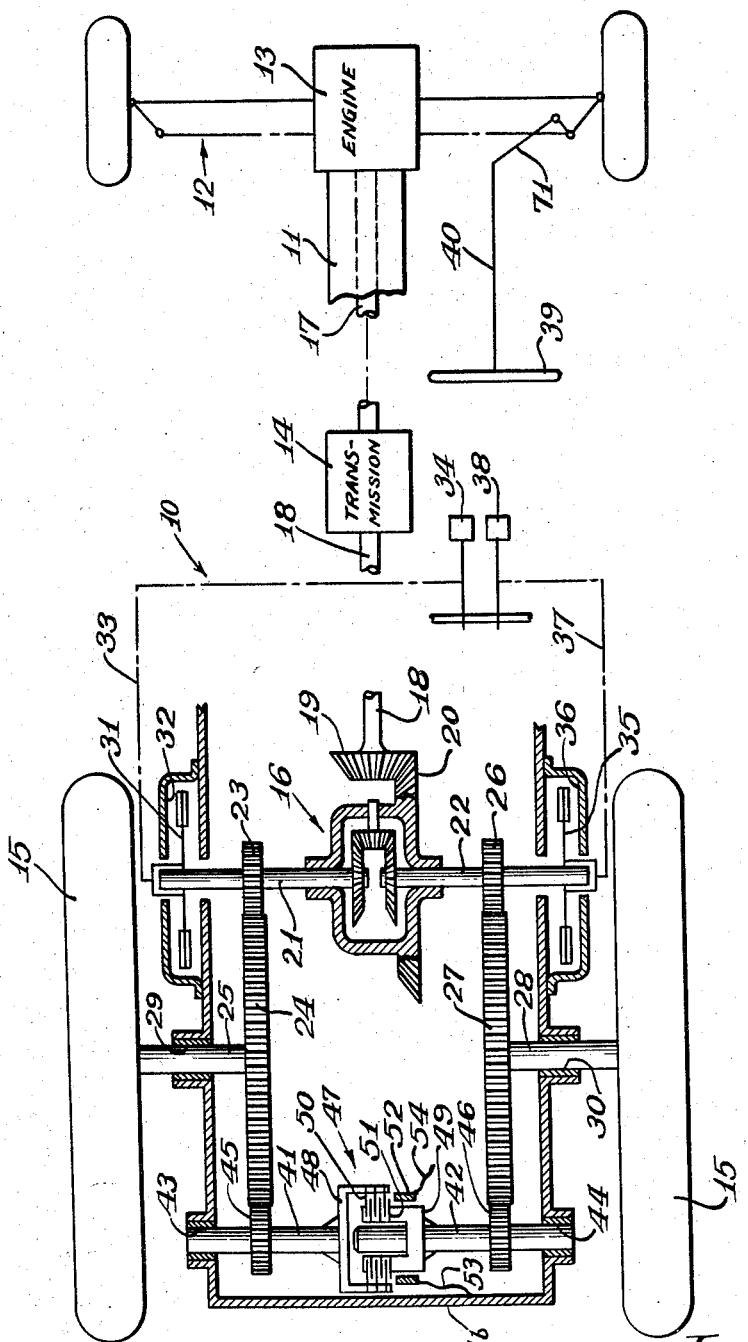
Fig. 1 is a diagrammatic plan view illustrating the front steering assembly, engine, change speed transmission, final drive assembly, traction wheels and braking mechanism components of a tractor, and showing additionally the application of the proposed invention thereto.

Referring now to the drawings, it will be seen that the vehicle selected for illustrating one preferred embodiment of the present invention constitutes a four-wheeled tractor of generally conventional design. The tractor, which is shown in diagrammatic fashion, has only a limited number of the components thereof included since it was felt that the remaining components which are generally conventional are unnecessary to a full and complete understanding of the invention. The tractor, represented generally by the numeral 10, includes a longitudinally extending frame or chassis assembly 11, a steerable front or dirigible wheel assembly 12, a power plant or driving engine 13, a change speed transmission 14, a pair of transversely spaced rear traction wheels 15, 15 and a final drive assembly including a differential drive unit 16.

The engine 13 may be any generally conventional power plant suitable for such employment and may be mounted by suitable means to the frame or chassis assembly 11. The engine is drivingly connected by a shaft 17 with the change-speed transmission 14 and said transmission is further connected by a drive shaft 18 with a beveled pinion gear 19, fixedly mounted on the ring gear end thereof, which engages and drives a beveled ring gear 20 that, together with the differential drive unit 16, forms a portion of the final drive for the tractor. Coaxial shafts 21 and 22 formed as a sectional countershaft are differentially driven by the differential unit 16 and a gear 23 constrained for rotation with the shaft 21 meshes with and drives a relatively large bull gear 24 which is fixed to the wheel axle 25, while a gear 26 on the shaft 22 meshes with and drives a relatively large bull gear 27 which is constrained for rotation with the opposite wheel axle 28. The respective wheel axles 25 and 28 are, in turn, journaled in bearing members 29 and 30 which are suitably mounted in a housing, such as is indicated at 11b, that may form part of the rear portion of the vehicle frame or chassis 11. It will be readily understood now that the transmission drive shaft 18 is drivingly connected with the traction wheels 15, 15 through the differential drive unit 16, gears 23, 24, and 26, 27, and the respective wheel axle shafts 25 and 28.

A friction brake 31 operatively mounted on one end of shaft 21 engages a cooperating brake drum 32, in turn, affixed to the housing member 11b and a suitable operating linkage mechanism, indicated diagrammatically by the broken line 33, connects with a foot pedal 34 for manually actuating and engaging said brake, while a similar brake 35 mounted on shaft 22 is engageable with a cooperating brake drum 36 and is actuated through suitable linkage mechanism 37 that is connected with the foot pedal 38. As thus arranged the two brake mechanisms are independently operable, as is well understood, for purposes of facilitating turning of the vehicle, which turning is generally initiated by manipulation of the steering wheel 39 connected through a steering column 40 with the dirigible wheels of the front steering assembly 12.

Coaxial shafts 41 and 42 formed as a sectional countershaft may be journaled, respectively, in bearings 43 and 44 which are suitably mounted in a portion of the housing 11b. A gear 45 mounted on shaft 41 and constrained for rotation therewith meshes with the large bull gear 24 on one side of the tractor, while a similar gear 46 mounted on shaft 41 and constrained for rotation therewith meshes with the bull gear 27 on the other side of the vehicle. The opposite or interiorly projecting end portions of shafts 41 and 42, respectively, extend into and are secured to cooperatively engageable members or portions of a friction clutch mechanism, shown generally by the reference numeral 47.

Clutch 47, preferably, is of the electrically actuated variety and, since devices of this character are so well known in the art, it was felt that only a diagrammatic representation thereof need be made in order to illustrate its application and to explain its relative relationship to the present invention.

In a conventional electric clutch, such as is represented by the reference numeral 47, one member may be fashioned in the form of a yoke-like bracket 48 that is affixed to one end of the coaxial countershaft 41 and constrained for rotation therewith, while another cooperating member in the form of a telescoping yoke-like bracket 49 receives one end of the coaxial countershaft 42 and is constrained for rotation therewith. A plurality of friction discs, such as 50, are splined for axial movement of the bracket 48, while a plurality of cooperating friction discs 51 mounted as by splining on the bracket member 49 are arranged for axial movement therealong. An energizing or electric actuating coil 52 is disposed to encircle the bracket member 49 and, when energized, to create an electric magnetic field that causes the cooperating friction discs 50 and 51 to be engaged and thereby drivingly couple together the sections of the coaxial countershafts 41 and 42. One terminal of actuating coil 52 may be connected by conductor 53 to the housing 11b which may be formed as a part of the frame or chassis 11, and which, for purposes of simplification of the drawings, is indicated only fragmentarily in Fig. 2. The other terminal of said clutch actuating coil may be connected by way of conductor 54 to one terminal of a steering assembly control or quadrant switch device 55.

The remaining terminal of steering unit quadrant switch 55 is connected by conductor 56 to a brake switch or make-and-break device 57. The opposite terminal of said brake switch is joined by conductor 58 to a manually operable disconnect device 59 and the opposite terminal thereof is joined by conductor 60 to one terminal of a foot-operated trigger switch mechanism 61 whose remaining terminal is connected by conductor 62 to one terminal of the vehicle's ignition switch device 63. The opposite terminal of said ignition switch is connected by conductor 64 to one polarity of a suitable source of electrical energy such as the vehicle's storage battery 65, while the opposite polarity thereof is connected by conductor 66 to the housing 11b of the frame or chassis assembly 11.

The steering control assembly switch 55 is intended to provide means for making-and-breaking the electric clutch control circuit upon manipulation or rotation of the steering wheel 39 a predetermined distance either in a clockwise or counterclockwise direction. The conventional steering assembly for a four-wheeled tractor vehicle, such as is diagrammatically illustrated herein, usually includes a steering column or shaft 40 which has a steering wheel 39 on one end thereof while the other end is provided with a worm gear 67 that is positioned to mesh with a sector gear 68 mounted on a transversely extending shaft 69 the outer end of which has secured thereto a pitman arm 70 and which, in turn, is pivotally connected to a drag link member 71. Said drag link, of course, is suitably connected with the remainder of the steering assembly 12 which, being of such conventional and well known construction, it was felt that the details thereof need not be further described herein. Suffice it to say that rotation of the wheel 39 in a clockwise direction will operate to turn the vehicle to the right and vice versa. Mounted on the transverse shaft 69 and constrained for rotation therewith is a hub-like ring or collar member 72 that carries with it a switch blade or arm 73, fashioned of suitable resilient and electrical conducting material, and the arm, upon rotation of said shaft, is positioned to ride on the surfaces of the circumferentially spaced sector members 74, 74a, and 74b of the quadrant switch 55. The sector 74, which is illustrated as the centrally positioned one of the three sectors, is connected to the conductor 56 forming part of the electrical control circuit. The ring 72 additionally functions as a slip ring or current-collector member and is engaged by a brush member 74c which, in turn, is connected into said electrical control circuit by way of the conductor 54. The mid-sector 74 of said switch, preferably, is mounted on suitable electrically insulating material (not shown), as will be readily understood, so as to avoid short-circuiting of the control circuit through the frame or chassis of the vehicle. If desired, of course, the same insulating effect could be obtained if the ring or hub-like member 72 was mounted on the shaft 69 with a suitable electrical insulating material disposed intermediate the ring and the shaft. Now when the arm 73 of said switch is in contact with the central sector 74, the electrical control circuit is closed and the clutch 47 is energized. Such condition will, of course, prevail as long as the vehicle is travelling in a relatively straight path and said circuit will be interrupted or opened only upon turning of the steering wheel a predetermined distance. The amount of rotation of the steering wheel required to interrupt the circuit through switch 55 will, of course, vary with the particular vehicle and the steering linkage employed therewith. It has been found desirable, in a four-wheeled type of tractor, to interrupt the electric control circuit to deenergize the clutch 47 and uncouple the driving wheels 15, 15 when the front steerable wheels have been turned sufficiently to rotate the pitman arm 70 greater than 15° in either direction. The distance through which this arm and hence the switch arm 73 may be rotated before the circuit is interrupted is termed the "engagement angle" and, as illustrated, this is indicated as being substantially 30° although, as stated, it may vary with the vehicle or any specific steering linkage and hence this angular measurement should not be construed as a limitation on the proposed invention. The provision for engagement of said switch, such as indicated, will permit the vehicle to track and correct for limited variations in the ground surface without losing traction, while any appreciable variation will operate to disengage the clutch 47 and thus eliminate the resistance to turning which would otherwise be encountered while the driving wheels remained coupled together.

The brake switch 57 is fashioned with two individually operable elements, one each of which is actuated by a single brake mechanism. A switch blade or arm 75 is pivotally mounted for contact with the terminal 76 to complete the circuit therethrough, while a second switch blade or arm 77 is pivotally mounted for contact with the terminal 78 to complete the circuit through that portion of the device. The arm 75 is normally biased to a closed position by means of a spring 79, while the arm 77 is likewise normally biased to a closed position by a spring 80. Brake pedal 34 may be connected through a spring element 81 to the arm 75, while brake pedal 38 may be connected to arm 77 through a spring element 82. With both brake pedals in the brake released position, indicated in solid lines in Fig. 2, the blades 75 and 77 are retracted and, in engagement, respectively, with contact terminals 76 and 78 to complete the electrical circuit therethrough. Now, as will be seen, when either brake pedal is actuated, such as moved to the brake engaged position indicated in dotted lines in Fig. 2, the electrical circuit through the brake switch 57 is interrupted; hence the flow of electrical energy to the clutch 47 is interrupted, said clutch is disengaged and the driving wheels 15, 15 are uncoupled. In this condition a turn may be negotiated without difficulty or the vehicle may be otherwise braked for stopping purposes. However, any attempt to turn the vehicle by braking one wheel, as is common practice with tractor type vehicles, will immediately operate to disengage the clutch and uncouple the driving wheels and thus permit the turn to be completed without resistance from said coupling arrangement.

The make-and-break switch device indicated at 61 may take the form of a trigger or plunger mechanism that is positioned in the floor of the vehicle and is operated as a pedal switch by the operator's foot. A button-like member 83 is affixed to one end of a plunger rod or shaft 84 whose opposite end has fixedly positioned thereon a switch blade or bar 85 that is disposed to bridge the contacts or terminals 86, 87 to complete the electrical circuit through the switch. A spring 88 is disposed so as to normally urge the bar 85 into a closed position across the switch contacts, then in order to interrupt the control circuit for the clutch 47 the operator has only to step on the button 83 with sufficient force to overcome the reactive force of said spring. Release of pressure from button 83 permits the spring 88 to return the switch to a closed circuit condition.

The switch 59 may be a conventional single blade type of make-and-break mechanism wherein a switch blade or arm 89 is pivotally mounted for bridging the contacts thereof. The arm or blade 89 is adapted for manual operation by the operator of the vehicle.

The switch mechanism 63 represents the conventional ignition switch for the vehicle and may assume any one of many well-known forms for such devices. As is the case with many of the electrical components of vehicles it is desirable that connection be made to the dead side of the ignition switch so that when the ignition system is turned off the associated electrical circuits are likewise opened or interrupted.

From a review of the wiring diagram in Fig. 2 it will readily be noted that all of the make-and-break mechanisms in the clutch control circuit are connected in series, thus each one of these switches must be closed in order to energize the circuit and engage the clutch. By the same token interruption of any one of these devices operates to break or interrupt the circuit and thus deenergize said clutch. For example, actuation of the steering assembly, either brake mechanism, the foot switch, the manual switch or the ignition switch will operate to deenergize the control circuit and thus disengage the clutch 47 so as to uncouple the driving wheels 15, 15.

In Fig. 3 there is illustrated a modified application of the present invention. In this case the tractor vehicle is of the tricycle steering type wherein the front steering or dirigible wheel assembly, mounted on the frame or chassis assembly 11a, is fashioned with the two front wheels close together, as indicated at 12a, instead of spaced widely apart as shown for the four-wheeled tractor indicated in Fig. 1. In the tricycle-type tractor only the steering assembly differs from the four-wheeled type, hence it was felt unnecessary to illustrate or describe the remaining components thereof inasmuch as they have already been referred to above and, except for the addition of the appendage *a* thereto, the same reference characters have been used to designate like elements throughout.

Referring again to Fig. 3, it will be noted the operator's steering wheel 39a is mounted on a longitudinally extending steering column shaft 40a which has mounted on the opposite end thereof a worm gear 67a that meshes with a gear 68a mounted on the upper end of a vertically disposed shaft 89. The shaft 89 is operatively connected by suitable means (not shown) to the steering assembly 12a which rotates therewith. Mounted on the shaft 89 and constrained for rotation therewith is a hub-like ring or collar member 90 that carries with it a switch blade or arm 91, fashioned of suitable resilient and electrical conducting material, and the arm, upon rotation of said shaft, is positioned to ride on the surfaces of the circumferentially spaced sector members 92, 92a and 92b of the quadrant switch 55a. As before, the sector 92, which is illustrated as the centrally positioned one of three sectors, is connected to the conductor 56a which forms part of the electrical control circuit. The ring 90 likewise functions as a slip ring or current-collector and is engaged by a brush member 93 which, in turn, is connected into the electrical control circuit by way of the conductor 54a. The mid-sector 92, preferably, is mounted on suitable electrically insulating material (not shown), as will be readily understood, so as to avoid any shortcircuiting of said circuit through the vehicle frame or chassis. If desired, the same insulating effect may be obtained if the ring or hub-like member 90 is mounted on the shaft 89 with a suitable electrical insulating material disposed between said shaft and ring.

The operation of the above described alternative form is similar to that of the preferred embodiment so that when the arm 91 is in contact with the central sector 92 the electrical control circuit is closed and the clutch 47 is energized and engaged. This condition, again, will prevail as long as the vehicle is travelling in a relatively straight path and the control circuit will be interrupted or opened only upon turning of the steering wheel a predetermined distance. In this type of tractor it has been found desirable to provide a somewhat larger engagement angle, and, it will be noted, this is illustrated in Fig. 3 as approximately 45° so that the shaft 89 may be rotated through 22½° in either direction before the control circuit current is interrupted and the clutch 47 disengaged.

From the foregoing it should now be apparent that a novel means for coupling together the driving wheels of a vehicle has been shown and described, and it is to be understood that changes may be made in the construction without departing from the spirit of the invention or the scope thereof as defined in the appended claims.

What is claimed is:

1. In a vehicle of the type having a frame, an engine mounted on said frame, a steering wheel assembly carried at one end and a plurality of traction propelling wheels at the other end of said frame, said traction wheels being drivingly connectable with said engine, the combination, including: power transmission means having a sectional driving shaft, and a differential driving gear connecting the engine to the sections of said driving shaft; said traction wheels being disposed with one operatively connected with each end of said driving shaft; a plurality of independent brake mechanisms each operative to brake one of the sections of said driving shaft; a sectional countershaft parallel with said driving shaft; an electrically actuated clutch having the separate members thereof mounted each on one of the sections of said countershaft to operatively couple together said sections when said clutch members are engaged; separate drive means operatively connecting the sections of said countershaft one to each of said traction wheels; electrically energizable control means interconnecting said clutch, brakes and steering wheel assembly with a source of electrical energy and including a plurality of separately actuatable normally closed disconnect mechanisms operatively connected, respectively, one with each of said brake mechanisms so that it is actuable upon operation of a respective brake mechanism and one with said steering wheel assembly which is actuable when said assembly is rotated a predetermined amount in either direction; said disconnect mechanisms being electrically connected together in series so that actuation of any one of said disconnect mechanisms is operative to interrupt the flow of electrical energy from said source through said control means to effect the disengagement of said electric clutch.

2. In a vehicle of the type having a frame, an engine mounted on said frame, a steering wheel assembly carried at one end and a plurality of traction propelling wheels at the other end of said frame, said traction wheels being drivingly connectable with said engine, the combination, including: power transmission means having a sectional driving shaft, and a differential driving gear connecting the engine to the sections of said driving shaft, said traction wheels being disposed with one wheel each operatively connected with a respective section of said driving shaft; a plurality of independent brake mechanisms each operative to brake one of the sections of said driving shaft; a sectional countershaft parallel with said driving shaft; an electrically actuatable clutch having the separate members thereof mounted each on one of the sections of said countershaft to operatively couple together said sections when said clutch members are engaged; separate drive means operatively connecting the sections of said countershaft one to each of said traction wheels; electric circuit control means interconnecting said clutch, brakes and steering wheel assembly with a source of electrical energy; said control means including therein a plurality of separate disconnect mechanisms operatively connected, respectively, one with each of said brakes, and one with said steering wheel assembly, and being electrically connected in series so that actuation of any one of said disconnect mechanisms is operative to effect the disengagement of said electric clutch.

3. In a vehicle of the type having a frame, an engine mounted on said frame, ignition means for said engine connectable through an electric circuit control device with a source of electric energy carried by the vehicle, a steering wheel assembly mounted at one end and transversely spaced traction propelling wheels affixed at the other end of said frame and drivingly connectable with said engine for propelling the vehicle, the combination, including: power transmission means having a sectional driving shaft, and a differential driving gear connecting the engine to the sections of said driving shaft; said traction wheels being disposed with one wheel each operatively connected with a respective section of said driving shaft; a separate brake mechanism for each section of said driving shaft with each mechanism independently operative to brake a respective section of said driving shaft; a sectional countershaft parallel with said driving shaft; separate drive means operatively connecting each of the sections of said countershaft to a respective one of said traction wheels; an electrically actuatable clutch having the separate members thereof mounted each on one of the sections of said countershaft to operatively couple together said sections when said clutch members are engaged; electric circuit means interconnecting said clutch, brakes and steering wheel assembly through the vehicle's ignition circuit control device with the vehicle's source of electrical energy; said control means including therein a plurality of separately actuatable electric circuit disconnect mechanisms operatively connected, respectively, one with each of said brakes and with said steering wheel assembly and being electrically connected in a series relationship; said control means being operative upon actuation of any one of the disconnect mechanisms therein or upon interruption of the vehicle's ignition device for disengaging said electric clutch to uncouple the sections of said countershaft.

4. In a vehicle of the type having a longitudinally extending frame, an engine mounted on said frame, a steering wheel assembly mounted at one end and traction propelling wheels affixed to transversely spaced axles mounted at the other end of said frame and drivingly connectable with said engine for propelling the vehicle, the combination, including: power transmission means having a transversely extending sectional driving shaft with a gear fixedly mounted on the outwardly extending end portion of each section thereof, and a differential driving gear connecting the engine to the sections of said driving shaft; a relatively large gear fixedly mounted on each of the wheel axles and disposed in meshing relation with a respective gear of the sections of said driving shaft; a separate brake mechanism for each section of said driving shaft with each mechanism independently operative to brake a respective section of said driving shaft; a sectional countershaft parallel with said driving shaft, and having gears fixedly mounted one each on the outwardly extending end portion of each of said sections and disposed in meshing relation with a respective wheel axle gear; an electrically actuatable clutch having the separate members thereof mounted each on one of the sections of said countershaft to operatively couple together said sections when said clutch members are engaged, said sections being uncoupled when said clutch members are disengaged; electric circuit control means for said clutch including a plurality of separately actuatable electric circuit make-and-break devices; one each of such devices being operatively connected with each of said brake mechanisms and one with said steering wheel assembly; said make-and-break devices being electrically connected with a source of electrical energy, and being electrically connected in series so that actuation of any one of said make-and-break devices is operative to effect the disengagement of said electric clutch to uncouple the sections of said countershaft.

5. In a vehicle of the type having a frame, an engine mounted on said frame, a steering wheel assembly mounted at one end and traction propelling wheels affixed to transversely spaced axles mounted at the other end of said frame and drivingly connectable with said engine for propelling the vehicle, the combination, including: power transmission means having a transversely extending sectional driving shaft, and a differential driving gear connecting the engine to the sections of said driving shaft; said traction wheels being disposed with one wheel each operatively connected with a respective section of said driving shaft; a separate brake mechanism for each section of said driving shaft with each such mechanism independently operative to brake a respective section of said driving shaft; a sectional countershaft parallel with said driving shaft; individual drive means operatively connecting each of the sections of said countershaft to a respective one of said traction wheels; an electrically actuatable clutch having the separate members thereof mounted each on one of the sections of said countershaft to operatively couple together said latter sections when said clutch members are engaged, said sections being uncoupled when said clutch members are disengaged; electric circuit control means connecting said clutch with a source of electrical energy; said control means including a plurality of separately actuatable make-and-break devices with one each of such devices being operatively connected with each of said brake mechanisms, and having at least one of said devices adapted for manual operation directly by the vehicle operator, and being connected electrically in series so that actuation of any one of said make-and-break devices is operative to effect the disengagement of said electric clutch to uncouple the sections of said countershaft.

6. In a vehicle of the type having a longitudinally extending frame, an engine mounted on said frame, a steering wheel assembly mounted at one end and traction propelling wheels affixed to transversely spaced axles mounted at the other end of said frame and drivingly connectable with said engine for propelling the vehicle, the combination, including: power transmission means having a transversely extending sectional driving shaft with a gear fixedly mounted on an outwardly extending end portion of each section thereof, and a differential driving gear connecting the engine to the sections of said driving shaft; relatively large gears fixedly mounted one on each of the wheel axles and disposed in meshing relation with a respective gear of the sections of said driving shaft; a separate brake mechanism for each section of said driving shaft with each mechanism independently operative to brake a respective section of said driving shaft; a sectional countershaft parallel with said driving shaft, and having gears fixedly mounted one each on the outwardly extending end portion of each of said sections and disposed in meshing relation with a respective wheel axle gear; an electrically actuatable clutch having the separate members thereof mounted each on one of the sections of said countershaft to operatively couple together said sections when said clutch members are engaged, said sections being uncoupled when said clutch members are disengaged; electric circuit control means connecting said clutch with a source of electrical energy; said control means including a separately actuatable make-and-break device operatively connected with each of said brake mechanisms, and a make-and-break device adapted for operation by the foot of the vehicle operator, and being connected electrically in series so that actuation of any one of said make-and-break devices is operative to effect the disengagement of said electric clutch to uncouple the sections of said countershaft.

References Cited in the file of this patent

UNITED STATES PATENTS

| | | |
|---|---|---|
| 2,080,692 | Brown | May 18, 1937 |
| 2,611,442 | Thomas | Sept. 23, 1952 |

FOREIGN PATENTS

| | | |
|---|---|---|
| 173,974 | Austria | Feb. 10, 1953 |
| 178,007 | Austria | Mar. 25, 1954 |
| 62,855 | France | Feb. 16, 1955 |